(12) United States Patent
Kim et al.

(10) Patent No.: US 11,508,985 B2
(45) Date of Patent: Nov. 22, 2022

(54) ELECTRODE ASSEMBLY AND METHOD FOR MANUFACTURING THE SAME

(71) Applicant: LG CHEM, LTD., Seoul (KR)

(72) Inventors: Dae Soo Kim, Daejeon (KR); Young Deok Kim, Daejeon (KR); Song Yi Han, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 183 days.

(21) Appl. No.: 16/651,564

(22) PCT Filed: Jun. 27, 2019

(86) PCT No.: PCT/KR2019/007817
§ 371 (c)(1),
(2) Date: Mar. 27, 2020

(87) PCT Pub. No.: WO2020/017781
PCT Pub. Date: Jan. 23, 2020

(65) Prior Publication Data
US 2020/0266476 A1   Aug. 20, 2020

(30) Foreign Application Priority Data
Jul. 19, 2018   (KR) .................. 10-2018-0084109

(51) Int. Cl.
*H01M 10/14* (2006.01)
*H01M 10/04* (2006.01)
(Continued)

(52) U.S. Cl.
CPC ......... *H01M 10/0459* (2013.01); *H01M 4/13* (2013.01); *H01M 10/0585* (2013.01); *H01M 10/6571* (2015.04); *H01M 50/54* (2021.01)

(58) Field of Classification Search
CPC .......... H01M 10/0459; H01M 10/045; H01M 10/0454; H01M 10/6571; H01M 10/657;
(Continued)

(56) References Cited

U.S. PATENT DOCUMENTS

| 8,092,936 B2 | 1/2012 | Xiankai et al. |
| 8,708,321 B2 | 4/2014 | Hong |

(Continued)

FOREIGN PATENT DOCUMENTS

| CN | 106252659 A | 12/2016 |
| EP | 3675264 A1 | 7/2020 |

(Continued)

OTHER PUBLICATIONS

Extended European Search Report dated Dec. 3, 2020 issued by the European Patent Office in corresponding European patent application No. 19838352.3.
(Continued)

*Primary Examiner* — Raymond Alejandro
(74) *Attorney, Agent, or Firm* — Morgan, Lewis & Bockius LLP

(57) ABSTRACT

The present invention relates to an electrode assembly. The electrode comprises: a plurality of unit electrodes formed by connecting a plurality of electrodes made of an electrode mixture having a solid shape to each other; a separator interposed between the plurality of unit electrodes; and an electrode tab attached to the unit electrode, wherein the electrode tab comprises first and second electrode tabs, which are respectively attached to the unit electrodes and have different specific resistance.

6 Claims, 9 Drawing Sheets

(51) Int. Cl.
*H01M 10/6571* (2014.01)
*H01M 4/13* (2010.01)
*H01M 10/0585* (2010.01)
*H01M 50/54* (2021.01)

(58) Field of Classification Search
CPC ......... H01M 10/0585; H01M 10/0583; H01M 50/54; H01M 50/538; H01M 50/536; H01M 4/13; H01M 4/06
See application file for complete search history.

(56) References Cited

U.S. PATENT DOCUMENTS

| | | | |
|---|---|---|---|
| 9,478,829 B2 | 10/2016 | Wang et al. | |
| 2004/0185332 A1* | 9/2004 | Botos | H01M 50/538 429/96 |
| 2009/0159347 A1 | 6/2009 | Zhou et al. | |
| 2013/0029212 A1 | 1/2013 | Hong | |
| 2014/0272504 A1 | 9/2014 | Edington et al. | |
| 2014/0342194 A1 | 11/2014 | Wang et al. | |
| 2015/0380717 A1 | 12/2015 | Ryu et al. | |
| 2020/0335763 A1 | 10/2020 | Kim et al. | |

FOREIGN PATENT DOCUMENTS

| | | |
|---|---|---|
| JP | 3403678 B2 | 5/2003 |
| JP | 2004-047239 A | 2/2004 |
| KR | 10-1224172 B1 | 1/2013 |
| KR | 10-2013-0014371 A | 2/2013 |
| KR | 10-2016-0008617 A | 1/2016 |
| KR | 10-2016-0027364 A | 3/2016 |
| KR | 10-2016-0086795 A | 7/2016 |
| KR | 10-2017-0067308 A | 6/2017 |
| KR | 10-1781487 B1 | 9/2017 |

OTHER PUBLICATIONS

International Search Report (with partial translation) and Written Opinion issued in corresponding International Patent Application No. PCT/KR2019/007817, dated Oct. 7, 2019.

* cited by examiner

ELECTRODE ASSEMBLY AND METHOD FOR MANUFACTURING THE SAME

CROSS-REFERENCE TO RELATED APPLICATION

The present application claims the benefit of the priority of Korean Patent Application No. 10-2018-0084109, filed on Jul. 19, 2018, which is hereby incorporated by reference in its entirety.

TECHNICAL FIELD

The present invention relates to an electrode assembly and a method for manufacturing the same, and more particularly, an electrode assembly comprising a unit electrode having a new structure and a method for manufacturing the same.

BACKGROUND ART

In general, secondary batteries refer to chargeable and dischargeable batteries, unlike primary batteries that are not chargeable. The secondary batteries are being widely used in the fields of small and advanced electronic devices such as mobile phones, PDAs, and notebook computers.

Such a secondary battery comprises an electrode assembly, an electrode lead coupled to the electrode assembly, and a pouch accommodating the electrode assembly in a state in which a front end of the electrode lead is withdrawn to the outside. The electrode assembly has a structure in which a plurality of electrodes and a plurality of separators are alternately laminated.

Each of the electrodes comprise a collector and an electrode active material applied to the collector. That is, the electrode is manufactured by applying the liquid electrode active material to a surface of the collector at a predetermined thickness.

However, the electrode has to comprise the collector. Thus, there is a problem that it is difficult to newly design an electrode having a novel structure.

DISCLOSURE OF THE INVENTION

Technical Problem

The present invention has been made to solve the above-mentioned problem, and an object of the present invention is to provide an electrode assembly capable of realizing a unit electrode having a novel structure by using an electrode made of a solid electrode mixture without a collector and particularly improving charging performance and a method for manufacturing the same.

Technical Solution

An electrode assembly according to the present invention for achieving the above object comprises: a plurality of unit electrodes formed by connecting a plurality of electrodes made of an electrode mixture having a solid shape to each other; a separator interposed between the plurality of unit electrodes; and an electrode tab attached to the unit electrode, wherein the electrode tab comprises first and second electrode tabs, which are respectively attached to the unit electrodes and have different specific resistance.

The first electrode tab may have specific resistance less than that of the second electrode tab and be used when the unit electrode is charged at a set charging rate or less, and the second electrode tab may have specific resistance greater than that of the first electrode tab and be used when the unit electrode is rapidly charged at the set charging rate or more.

The plurality of unit electrodes may comprise a first unit electrode and a second unit electrode, and a heating wire may be further attached to the second unit electrode.

An electrode assembly according to the present invention comprises: a plurality of unit electrodes formed by connecting a plurality of electrodes made of an electrode mixture having a solid shape to each other; a separator interposed between the plurality of unit electrodes; and an electrode tab attached to the unit electrode, wherein the plurality of unit electrodes comprise a first unit electrode and a second unit electrode, and a heating wire is further attached to the second unit electrode.

The first unit electrode may be provided as a positive unit electrode, and the second unit electrode may be provided as a negative unit electrode.

The electrode mixture may be formed by further mixing at least one or more of a conductive material or a binder with an electrode active material.

The plurality of electrodes may be connected to each other in an area or thickness direction of the electrode.

The plurality of electrodes may form an integrated unit electrode by an adhesive property of an outer surface of the electrode, and the integrated unit electrode may form a unit electrode having integrated conductivity by conductivity of the electrode.

The electrode tab may be provided as an electrode wire having flexibility.

A method for manufacturing an electrode assembly according to the present invention comprises: an electrode manufacturing step (S10) of compressing a solid electrode mixture to manufacture a plurality of electrodes; a unit electrode manufacturing step (S20) of connecting the plurality of electrodes to each other in an area or thickness direction to manufacture plurality of unit electrodes; an electrode tab attachment step (S30) of attaching an electrode tab 130 to the plurality of unit electrodes; and an electrode assembly manufacturing step (S40) of interposing a separator between the plurality of unit electrodes to which the electrode tab is attached to manufacture an electrode assembly, wherein, in the electrode tab attachment step (S30), the electrode tab comprises first and second electrode tabs having different specific resistance.

After the electrode assembly manufacturing step (S40), the method may further comprise an electrode assembly charging step (S50) of charging the electrode assembly, wherein the electrode assembly charging step (S50) may comprise a process of charging the electrode assembly by using the first electrode tab having low specific resistance when the unit electrode is charged at a set charging rate or less and a process of charging the electrode assembly by using the second electrode tab having high specific resistance when the unit electrode is charged at the set charging rate or more.

When the unit electrode is rapidly charged at the set charging rate or more, the electrode assembly charging step (S50) may further comprise a process of allowing the unit electrode to increase in temperature through the heating wire.

Advantageous Effects

The electrode assembly according to the present invention may comprise the unit electrode by connecting the plurality of electrodes made of the solid electrode mixture as a whole.

The electrode mixture may be formed by further mixing at least one or more of the conductor and the binder in the electrode active material. Therefore, the unit electrode may be realized without the collector, and particularly, the unit cell having the new structure in the direction in which the plurality of electrodes are connected to each other may be designed newly.

Particularly, in the electrode assembly according to the present invention, the unit electrode may comprise the electrode tab provided with the first and second electrode tabs, which have different specific resistance. Thus, the first and second electrode tabs, which have different specific resistance, may be selectively used according to the charging rate of the electrode assembly. Therefore, the charging performance of the electrode assembly may be improved.

In the electrode assembly according to the present invention, the first electrode tab may have a specific resistance less than that of the second electrode tab. Thus, the first electrode tab may be used when the unit electrode is charged at the set charging value or less. On the other hand, the second electrode tab may be used when the unit electrode is rapidly charged at the set charging value or more. Therefore, the rapid charging performance of the electrode assembly may be improved.

The unit electrode of the electrode assembly according to the present invention may comprise the first unit electrode and the second unit electrode. Here, the heating wire may be further attached to the second unit electrode. Here, the first unit electrode may be the positive electrode, and the second unit electrode may be the negative electrode. Thus, when the electrode assembly is rapidly charged, the temperature of the second unit electrode, which is the negative electrode, may increase through the heating wire, and as the temperature of the negative electrode increases, the rapid charging performance of the electrode assembly may be improved.

According to the electrode assembly of the present invention, the conductive material and the binder may be further mixed with the electrode mixture to form the electrode. Therefore, the unit electrode having the conductivity and the adhesion may be realized.

According to the electrode assembly of the present invention, the electrode tab may be attached to the unit electrode, and the electrode tab may be attached to all the entire surface and edge surface of the unit electrode. Therefore, the unit electrode may be more newly designed.

According to the electrode assembly of the present invention, the electrode tab may be formed by using the electrode wire having the flexibility and conductivity. Therefore, the electrode tab may be freely adjusted in position.

The electrode assembly according to another embodiment of the present invention may comprise the plurality of unit electrodes with the separator therebetween. Here, the unit electrode may be formed by connecting the plurality of electrodes made of the solid electrode mixture to each other. The plurality of unit electrodes may comprise the first unit electrode and the second unit electrode, and the heating wire may be further attached to the second unit electrode. Thus, when the electrode assembly is rapidly charged, the temperature of the second unit electrode may increase through the heating wire, and as the temperature of the negative electrode increases, the rapid charging performance of the electrode assembly may be improved.

MODE FOR CARRYING OUT THE INVENTION

Figure 1:
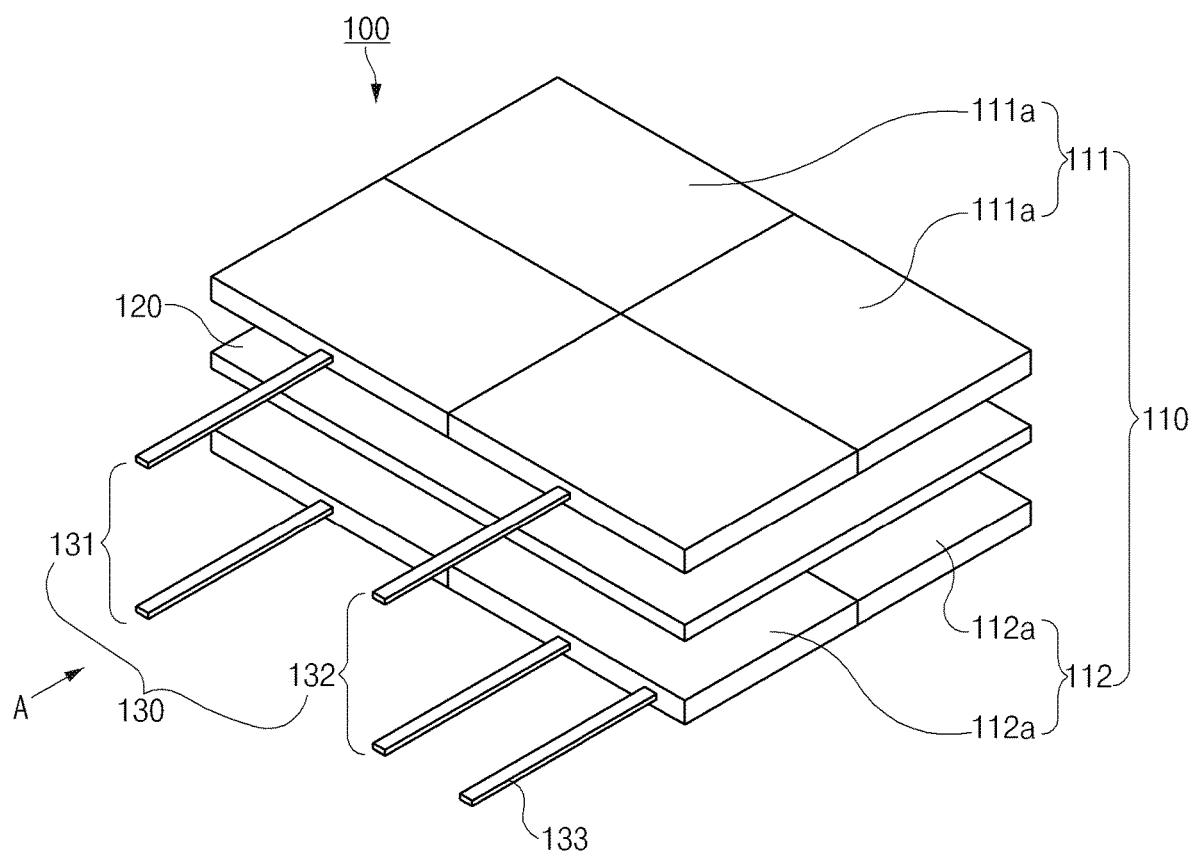
FIG. 1 is a perspective view of an electrode assembly according to a first embodiment of the present invention.

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

Figure 2:
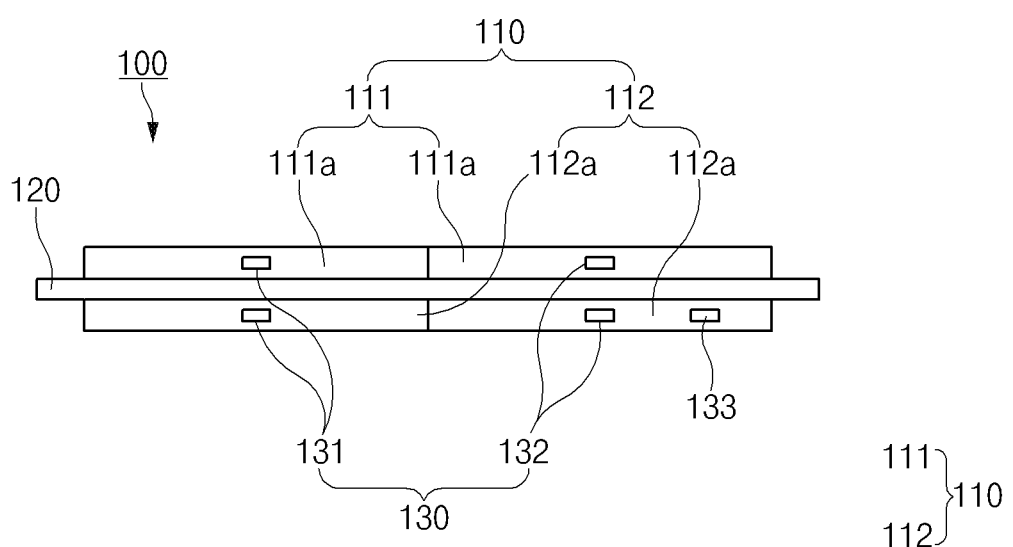
FIG. 2 is a front view of the electrode assembly according to the first embodiment of the present invention.

The front view of FIG. 2 refers to a view when viewed in an 'A' direction of FIG. 1.

[Electrode Assembly According to First Embodiment of the Present Invention]

An electrode assembly according to a first embodiment of the present invention has a structure in which a plurality of unit electrodes and a plurality of separators are alternately laminated. The unit electrode may be manufactured by a plurality of electrodes, each of which is entirely made of a solid electrode mixture, to each other without a collector. Thus, the unit electrode having a novel structure may be newly designed according to a direction in which the plurality of electrodes are connected to each other.

For example, as illustrated in FIGS. 1 and 2, an electrode assembly 100 according to the first embodiment of the present invention has a structure in which a plurality of unit electrodes 110 and a plurality of separators 120 are alternately laminated. Each of the unit electrodes 110 is formed by connecting a plurality of electrodes to each other, and the entire electrode is made of an electrode mixture having a solid shape.

That is, the plurality of unit electrodes 110 comprise a first unit electrode 111 and a second unit electrode 112, which have polarities different from each other. The first unit electrode 111 is formed by a plurality of first electrodes 111*a*, each of which is entirely made of a solid first electrode mixture, to each other, and the second unit electrode 112 is formed by a plurality of second electrodes 112*a*, each of which is entirely made of a solid second electrode mixture, to each other.

Here, since the first or second electrode 111*a* or 112*a* does not comprise a collector, a plurality of first or second electrodes 111*a* or 112*b* may be connected to each other in an area or thickness direction of the electrode. Thus, the first or second unit electrode 111 or 112 having a new structure may be newly designed, and a newly designed electrode assembly 100 comprising the first and second unit electrodes 111 and 112, which are newly designed, and the separator 120 may be realized.

An embodiment of the electrode assembly 100 that is newly designed as described above will be described as follows.

Figure 3:
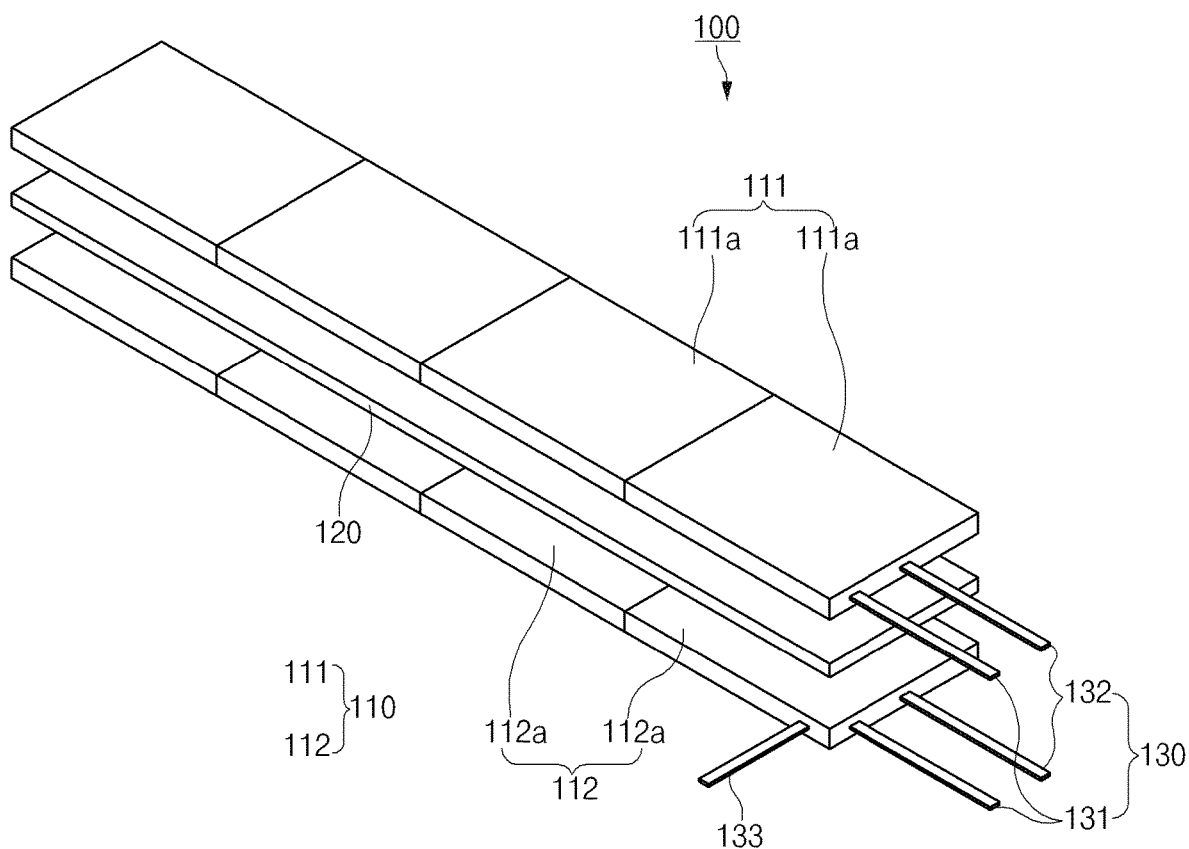
FIGS. 3 to 5 are perspective views illustrating various shapes of the electrode assembly according to the first embodiment of the present invention.

First, as illustrated in FIG. 3, in the electrode assembly, the plurality of first electrodes 111a or the plurality of second electrodes 112a may lengthily extend in an one area direction of the electrode to realize a unit electrode 110 comprising the first unit electrode 111 and the second unit electrode, each of which has a predetermined length. Therefore, an electrode assembly 100 having a predetermined length and comprising the first unit electrode 111, the second unit electrode 112, each of which has the predetermined area, and a separator 120 may be realized.

Second, as illustrated in FIG. 1, the plurality of first electrodes 111a or the plurality of second electrodes 112a may be connected to each other in all area directions of the electrode to realize a unit electrode 110 comprising the first unit electrode 111 and the second unit electrode 112, each of which has a predetermined area. Therefore, an electrode assembly 100 having a predetermined area and comprising the first unit electrode 111, the second unit electrode 112, each of which has the predetermined area, and a separator 120 may be realized.

Figure 4:
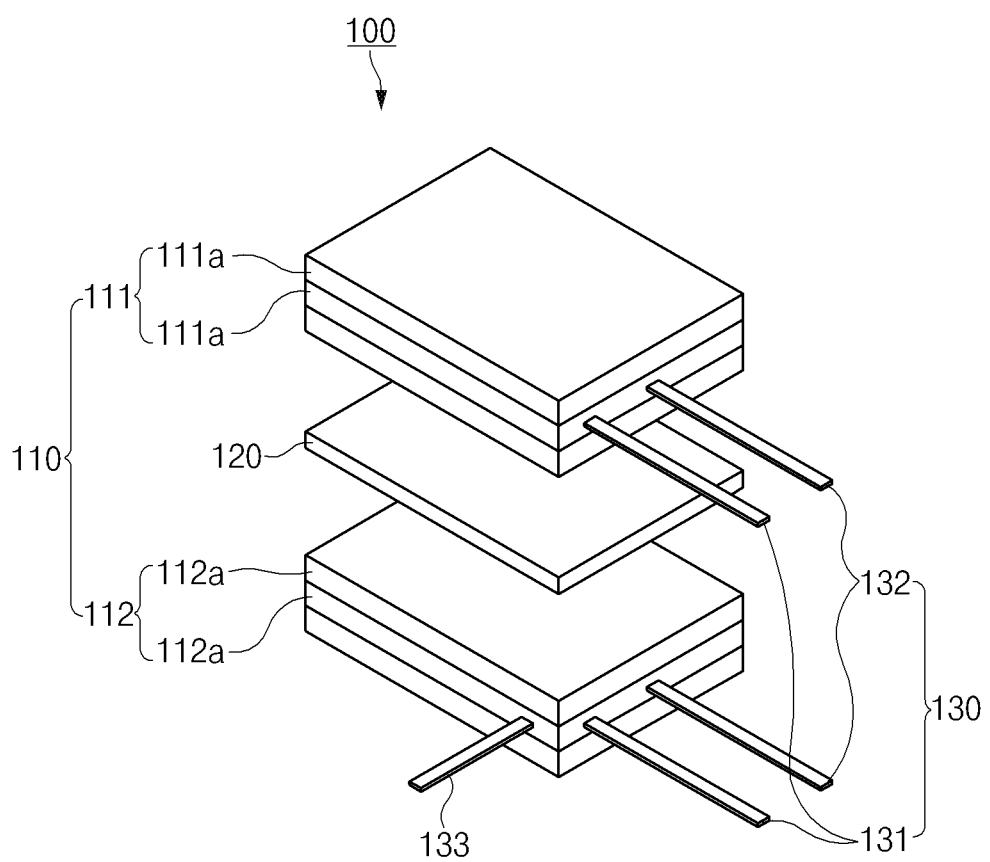

Third, as illustrated in FIG. 4, in the electrode assembly, the plurality of first electrodes 111a or the plurality of second electrodes 112a may be connected to each other in a thickness direction of an electrode to realize a unit electrode 110 comprising the first unit electrode 111 and the second unit electrode 112, each of which has a predetermined thickness. Therefore, an electrode assembly 100 having a predetermined thickness and comprising the first unit electrode 111, the second unit electrode 112, each of which has the predetermined thickness, and a separator 120 may be realized.

Fourth, the plurality of first electrodes 111a or the plurality of second electrodes 112a may be connected to each other in all of an area direction and a thickness direction of the electrode to realize a unit electrode 110 comprising the first unit electrode 111 and the second unit electrode 112, each of which has a predetermined area and thickness. Therefore, an electrode assembly 100 having a predetermined area and thickness and comprising the first unit electrode 111, the second unit electrode 112, each of which has the predetermined area and thickness, and the separator 120 may be realized.

Figure 5:
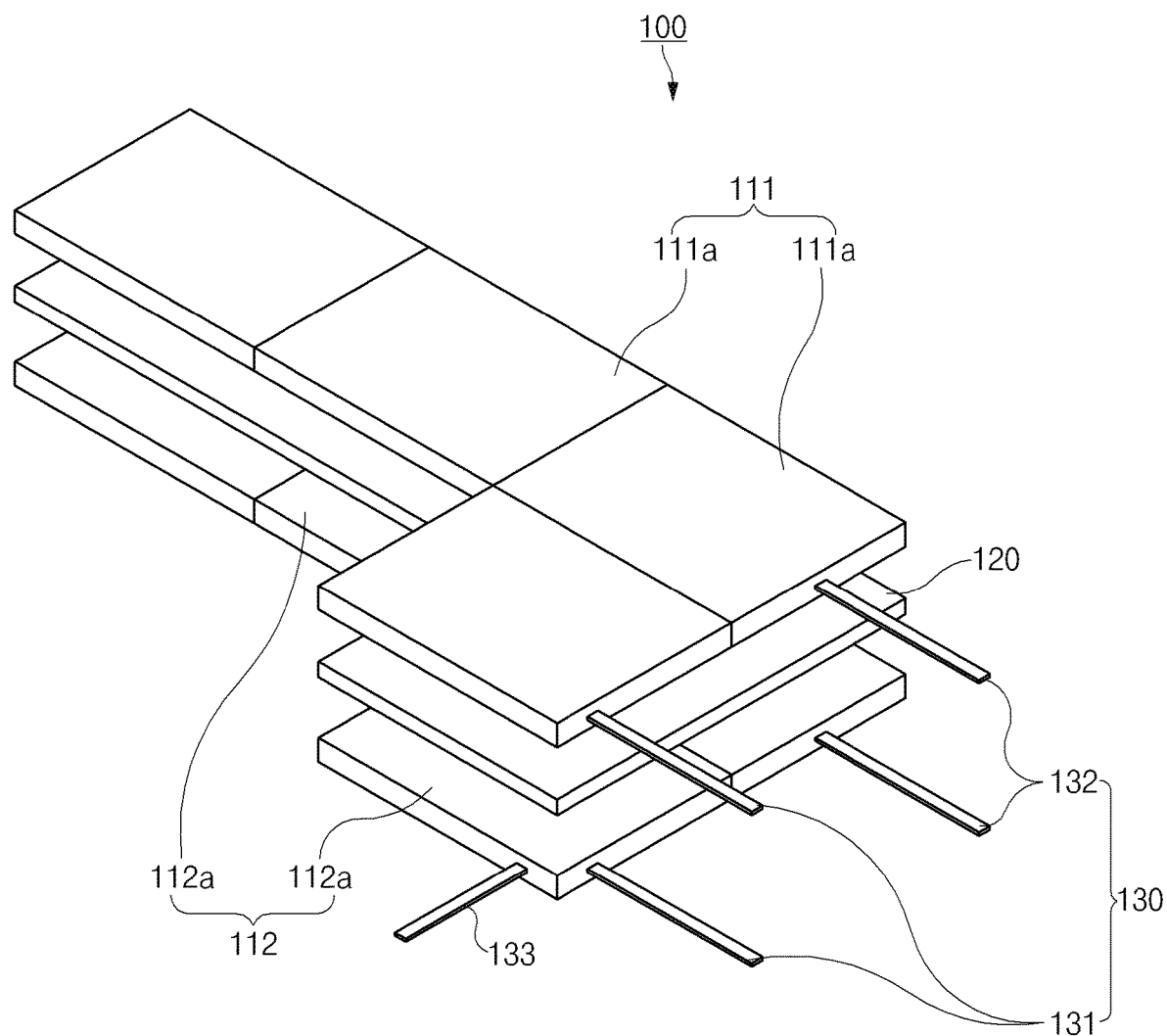

Fifth, as illustrated in FIG. 5, in an electrode assembly, a plurality of first electrodes 111a or a plurality of second electrodes 112a may be irregularly connected to each other in an area direction and thickness direction of an electrode to provide a unit electrode 110 comprising a first unit electrode 111 and a second unit electrode 112, each of which has a new shape. Therefore, an electrode assembly 100 having a new shape and comprising the first unit electrode 111, the second unit electrode 112, each of which has the new shape, and a separator 120 may be realized. Particularly, the unit electrode 110 and the electrode assembly 100 may be newly designed to match the inner space of a battery case that is designed to be compact through the irregular connection of the electrodes as described above to significantly improve marketability.

Sixth, the plurality of first electrodes 111a or the plurality of second electrodes 112a may be connected to each other in directions different from each other to realize a unit electrode 110 comprising the first unit electrode 111 and the second unit electrode 112, which have shapes different from each other. Therefore, an electrode assembly 100 comprising the first unit electrode 111, the second unit electrode 112, which have the shapes different from each other, and the separator 120 may be newly designed.

That is, the number of first electrodes 111a and the connection direction of the first electrodes 111a may be different from the number of second electrodes 112a and the connection direction of the second electrodes 112a. For gradually decreases in width from the lowermost end to the uppermost end thereof, an electrode assembly having a screw shape that gradually rotates in one direction from the lowermost end to the uppermost end thereof, or an electrode assembly having a hollow defined in a vertical direction may be realized.

The electrode may be made of a solid electrode mixture. The solid electrode mixture may be formed by mixing at least one or more of a solid conductive material and a solid binder with an solid electrode active material. Thus, the electrode has a polarity through the electrode active material, has a conductivity through the conductive material, and has coupling and adhesion between the electrode active material and the conductive material through the binder.

For example, the first electrode 111a is formed by mixing the conductive material and the binder with a solid first electrode active material, and the second electrode 112a is formed by mixing the conductive material and the binder with a solid second electrode active material.

Thus, each of the plurality of electrodes may be made of the solid electrode mixture without the collector, and thus, all surfaces of the electrode may have adhesion. Therefore, the first unit electrode 111 and the second unit electrode 112, which are integrated with each other, may be realized.

Also, each of the plurality of electrodes may be made of the solid electrode mixture without the collector, and thus, all surfaces of the electrode may have conductivity. Therefore, the first unit electrode 111 and the second unit electrode 112, which have conductivity and are integrated with each other, may be realized.

The electrode assembly according to an embodiment of the present invention comprises an electrode tab 130 attached to the unit electrode 110, and the electrode tab 130 is attached to at least one or more of an entire surface or an edge surface of the unit electrode 110.

For example, referring to FIGS. 1 and 2, the electrode tab 130 may comprise first and second electrode tabs 131 and 132, which are respectively attached to the first and second unit electrodes 111 and 112 and have different specific resistance. Each of the first and second electrode tabs 131 and 132 may be attached to one portion of an entire surface or an edge surface of the unit electrode 110.

Here, the first electrode tab 131 may have specific resistance less than that of the second electrode tab 132. That is, when the unit electrode 110 is charged at the set charging rate or less, the charging may be performed through the first electrode tab 131. When the unit electrode 110 is charged at the set charging rate or more, the charging may be performed through the second electrode tab 132.

That is, when the unit electrode 110 is charged at the set charging rate or more, the charging may be performed through the second electrode tab 132 having the specific resistance greater than that of the first electrode tab 131, and thus, the unit electrode 110 may be heated at a temperature higher than that of the first electrode tab 131. Thus, as the temperature of the unit electrode 110 increases, the metal charging performance may be improved to improve the charging rate of the unit electrode 110.

The first unit electrode may be a positive unit electrode, and the second unit electrode may be a negative unit electrode. That is, the negative unit electrode does not well increase in temperature when compared to the positive unit electrode, and thus, the charging performance may be deteriorated. To prevent this, the second electrode tab 132 having high specific resistance may be connected to the negative unit electrode, and the first electrode tab 131 having low specific resistance may be connected to the positive unit electrode. Thus, when charging, the temperature of the negative unit electrode may increase more effectively, and as a result, the charging performance of the negative unit electrode may be improved.

Here, a heating wire 133 may be further attached to the second unit electrode 112. The heating wire 133 may allow the second unit electrode 112, which is the negative unit electrode, to increase in temperature, thereby improving the charging performance of 112. That is, the negative unit electrode may increase in temperature largely through the heating wire to improve the charging performance of the negative unit electrode so as to correspond to the charging performance of the positive unit electrode, and as a result, the charging performance of the electrode assembly may be improved.

Particularly, each of the first and second electrode tabs 131 and 132 may be attached to one portion of the entire surface or edge surface of the first and second unit electrodes 111 and 112. Therefore, the attached position of the electrode tab 130 may be adjusted to match the shape of the battery case to significantly improve a degree of freedom in design of the secondary battery.

The electrode tab 130 may be provided as an electrode wire having flexibility and conductivity. Thus, the electrode tab 130 may be bent to match an inner space of a battery case (not shown) in which the electrode assembly 100 is accommodated and thus effectively accommodate the electrode assembly 100.

As illustrated in FIG. 1, the electrode tab 130 may be attached to a top surface of the unit electrode to effectively utilize a side space of the unit electrode, thereby realizing a more compact electrode assembly.

Thus, the electrode assembly 100 comprising the above-described constituents according to the first embodiment of the present invention may realize the unit electrode having a new structure by using the electrode made of the solid electrode mixture.

[Method for Manufacturing Electrode Assembly According to First Embodiment of the Present Invention]

Hereinafter, a method for manufacturing the electrode assembly according to the first embodiment of the present invention will be described.

Figure 6:
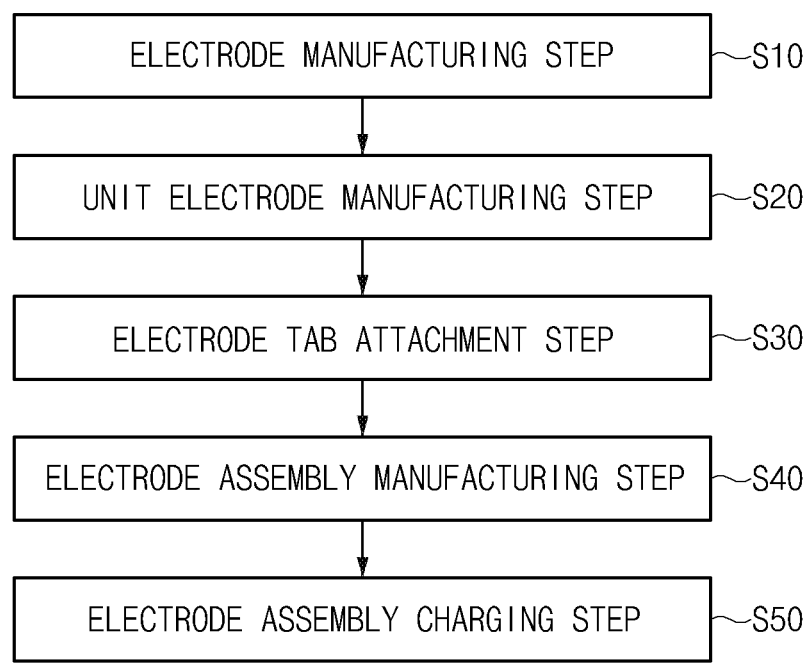
FIG. 6 is a flowchart illustrating a method for manufacturing the electrode assembly according to the first embodiment of the present invention.

As illustrated in FIG. 6, a method for manufacturing the electrode assembly according to the first embodiment of the present invention comprises an electrode manufacturing step (S10) of compressing a solid electrode mixture to manufacture a plurality of electrodes, a unit electrode manufacturing step (S20) of connecting the plurality of electrodes to each other to manufacture unit electrodes, an electrode tab attachment step (S30) of attaching an electrode tab 130 comprising first and second electrode tabs 131 and 132 to the plurality of unit electrodes, an electrode assembly manufacturing step (S40) of alternately laminating the plurality of unit electrodes, to which the electrode tab is attached, and a separator to manufacture an electrode assembly, and a charging step (S50) of charging the electrode assembly.

Electrode Manufacturing Step

The electrode manufacturing step (S10) comprises an electrode mixture manufacturing process and an electrode manufacturing process. In the electrode mixture manufacturing process, at least one or more of a solid conductive material and a solid binder are mixed with a solid electrode active material at a set ratio to manufacture the electrode mixture. For example, in the electrode mixture manufacturing process, a first electrode active material, the conductive material, and the binder are mixed with each other to manufacture a first electrode mixture, and a second electrode active material, the conductive material, and the binder are mixed with each other to manufacture a second electrode mixture.

In the electrode manufacturing process, the electrode mixture is inserted into a mold having the form of the electrode to strongly press the electrode mixture, thereby manufacturing an electrode. For example, the first electrode mixture is pressed to manufacture a plurality of first electrodes 111a, and the second electrode mixture is pressed to manufacture a plurality of second electrodes 112a. Here, each of the first electrodes 111a and the second electrodes 112a does not comprise a collector. Thus, each of the first electrode 111a and the second electrode 112a may have conductivity and adhesion on an entire surface thereof.

The electrode manufacturing step (S10) further comprises a process of dry mixing the electrode active material, the conductive material, and the binder under a high stirring rate condition.

For example, in a positive electrode manufacturing step, the positive electrode active material, the conductive material, and the binder are mixed with each other under the high stirring rate condition. Here, although not particularly limited, the positive electrode active material uses a general positive electrode active material, e.g., an alkali metal, an alkaline earth metal, a Group 13 element, a Group 14 element, a Group 15 element, a transition metal, a rare earth element, or lithium-containing metal oxide comprising a combination of the elements. Also, chalcogenide-based compounds may be also applied. As a non-limiting example, lithium transition metal oxide such as LiMxOy(M=Co, Ni, Mn, CoaNibMnc) (for example, lithium manganese composite oxides such as $LiMn_2O_4$, lithium nickel oxides such as $LiNiO_2$, lithium cobalt oxides such as $LiCoO_2$, and materials obtained by substituting a portion of manganese, nickel, and cobalt of the oxides with other general transition metals or lithium-containing vanadium oxide)-based positive active materials or a chalcogenide (for example, manganese dioxide, titanium disulfide, molybdenum disulfide, etc.)-based positive compounds may be applied.

More particularly, the positive electrode active material may be a lithium transition metal oxide-based positive electrode active material. For example, the positive electrode active material may be selected from the group consisting of $LiCoO_2$, $LiNiO_2$, $LiMn_2O_4$, $Li_4Mn_5O_{12}$, $LiFePO_4$, $Li(CoxNi1-x)O_2$ ($0.5 \le x < 1$), and $LiaNibCocX1dX_2eO_2$ (each of X1 and X2 independently represent at least one element selected from the group consisting of Mn, Al, Mg, Ti, Zr, Fe, V, W, Si, and Sn; where $0.8 \le a \le 1.3$, $0.1 \le b < 1.0$, $0.1 \le c < 1.0$, $0 \le d < 1$, $0 \le e < 1$).

The conductive material may be natural graphite, artificial graphite, carbon black, acetylene black-based or Gulf Oil Company products, or a mixture of one or more kinds of the materials.

The binder may comprise general binders used in the composition for forming the positive electrode. For example, polytetrafluoroethylene (PTFE), polyvinylidene fluoride (PVdF) or a copolymer thereof, styrene butadiene rubber (SBR), cellulose, and the like may be used as the binder.

In the stirring speed condition, a stirrer may operate at a stirring speed of 500 rpm to 5,000 rpm, preferably, 2,000 rpm to 3,000 rpm.

The binder may have a content of 0.5 parts by weight to 20 parts by weight, preferably 5 parts by weight to 10 parts by weight based on 100 parts by weight of the total weight of the positive electrode active material and the conductive material.

Unit Electrode Manufacturing Step

In the unit electrode manufacturing step (S20), the plurality of electrodes are connected to each other to manufacture a unit electrode having a novel structure. For example, in the unit electrode manufacturing step (S20), the plurality of first or second electrodes 111a or 112a are connected to each other in an area direction of the electrode to manufacture a first or second unit electrode 111 or 112 having a set area, the plurality of first or second electrodes 111a or 112a are connected to each other in a thickness direction of the electrode to manufacture a first or second unit electrodes 111 or 112 having a set thickness, or the plurality of first or second electrodes 111a or 112a are connected to each other in thickness and area directions to manufacture a first or second unit electrode 111 or 112 having a set area and thickness.

Particularly, in the unit electrode manufacturing step (S20), when the plurality of electrodes are irregularly connected to each other, a unit electrode having a shape of "⊏", "¬", "▫", or "H" may be manufactured.

The unit electrode manufacturing step (S20) may further comprise a process of thermally fusing the electrode. In the process of thermally fusing the electrode, heat and a pressure may be applied to the unit electrode in which the plurality of electrodes are connected to each other to activate adhesion between the plurality of electrodes, thereby manufacturing an integrated unit electrode.

After the unit electrode manufacturing step (S20), an electrode tab attachment step (S30) of attaching an electrode tab 130 to the unit electrode 110 may be further performed.

Electrode Tab Attachment Step

In the electrode tab attachment step (S30), the first and second electrode tabs 131 and 132 are attached to the first or second unit electrode 111 or 112. That is, all of the first and second electrode tabs 131 and 132 may be attached to the first unit electrode 111, and all of the first and second electrode tabs 131 and 132 may be attached to the second unit electrode 112. Here, the first or second electrode tab 131 and 132 may be attached to at least one or more of surfaces or edge surfaces of the first or second unit electrode 111 and 112.

Particularly, the electrode tab attachment step (S30) may further comprise a process of thermally fusing the electrode tab to more firmly attach the electrode tab. In the process of thermally fusing the electrode tab, heat and a pressure may be applied to the electrode tab attached to the unit electrode to more firmly attach the electrode tab to the unit electrode.

Here, the first electrode tab 131 and the second electrode tab 132 may have different specific resistance.

For example, the first electrode tab 131 has specific resistance less than that of the second electrode tab 132 and thus is used when the unit electrode is charged at the set charging rate or less. On the other hand, the second electrode tab 132 has specific resistance greater than that of the first electrode tab 131 and thus is used when the unit electrode is rapidly charged at the set charging speed or more. That is, when the unit electrode is charged, the second electrode tab 132 having the specific resistance greater than that of the first electrode tab 131 may more effectively increase in temperature that is higher than that of the unit electrode. Thus, as the temperature of the unit electrode increases, the rapid charging performance may be improved.

The electrode tab 130 may be formed by using an electrode wire having flexibility and conductivity. Thus, although the electrode tab 130 attached to the unit electrode 110 is attached at an erroneous position, the position of the electrode tab 130 may be corrected through the flexibility of the electrode tab 130.

Electrode Assembly Manufacturing Step

In the electrode assembly manufacturing step (S40), the plurality of unit electrodes 110, each of which has the novel structure, and one or more separators 120 are vertically laminated to manufacture the electrode assembly 100.

That is, the plurality of unit electrodes 110 comprise a first unit electrode 111 and a second unit electrode 112. A separator 120 may be disposed between the first unit electrode 111 and the second unit electrode 112 to manufacture the electrode assembly 100.

Electrode Assembly Charging Step

In the electrode assembly charging step (S50), a voltage is supplied to the electrode tab 110 to charge the electrode assembly 100. Here, the electrode assembly charging step (S50) comprises a process of charging the electrode assembly 100 by using the first electrode tab 111 having the low specific resistance when the unit electrode is charged at the set charging rate or less and a process of charging the electrode assembly 100 by using the second electrode tab 112 having the high specific resistance when the unit electrode is charged at the set charging rate or more.

In addition, in the electrode assembly charging step (S50), when the rapid charging is performed, the electrode assembly 100 may be charged by using all of the first and second electrode tabs 111 and 112 to more improve the chargeability of the electrode assembly.

Particularly, when the unit electrode is rapidly charged at the set charging value or more, the electrode assembly charging step (S50) may further comprise a process of allowing the unit electrode to increase in temperature through the heating wire 133. Thus, as the temperature of the unit electrode increases effectively, the charging performance may be improved, and as a result, the unit electrode may be rapidly charged more effectively.

Hereinafter, in descriptions of another embodiment of the present invention, constituents of the second embodiment having the same constituent and function as the first embodiment have been given the same reference numeral in the drawings, and thus duplicated description will be omitted.

[Electrode Assembly According to Second Embodiment of the Present Invention]

Figure 7:
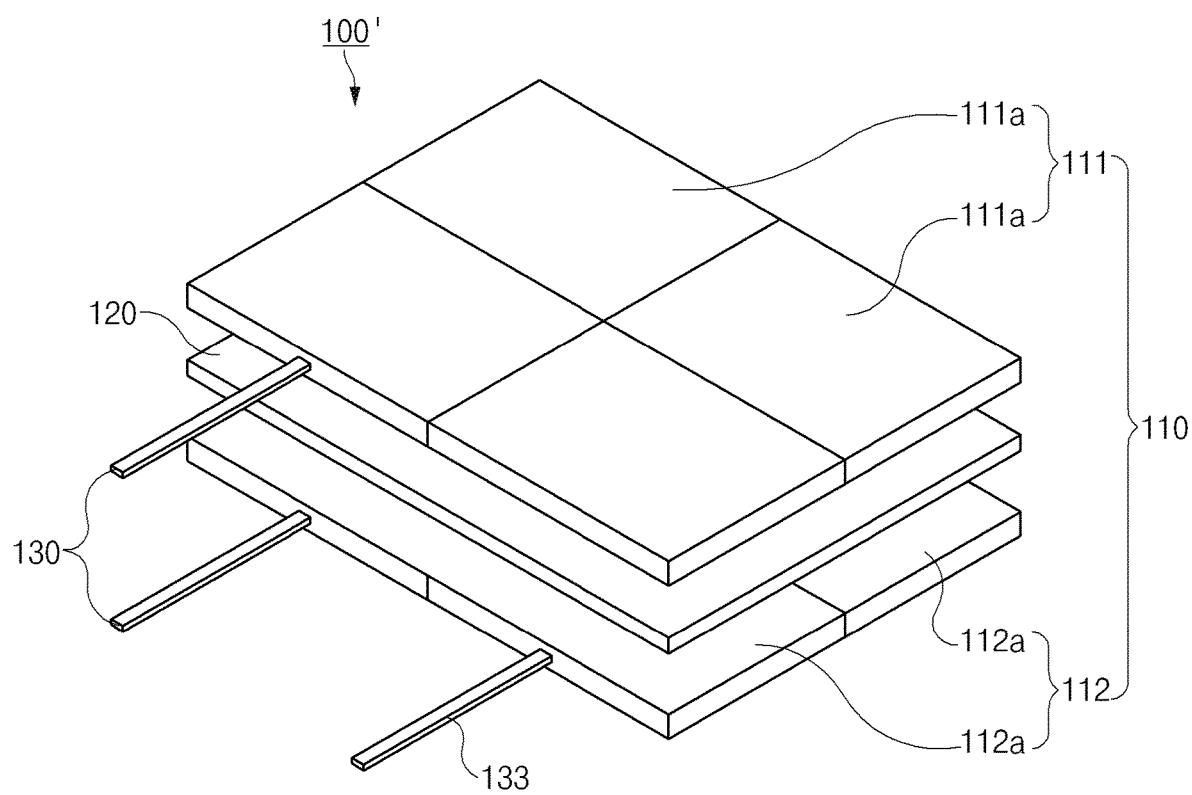
FIG. 7 is a perspective view of an electrode assembly according to a second embodiment of the present invention.
Figure 8:
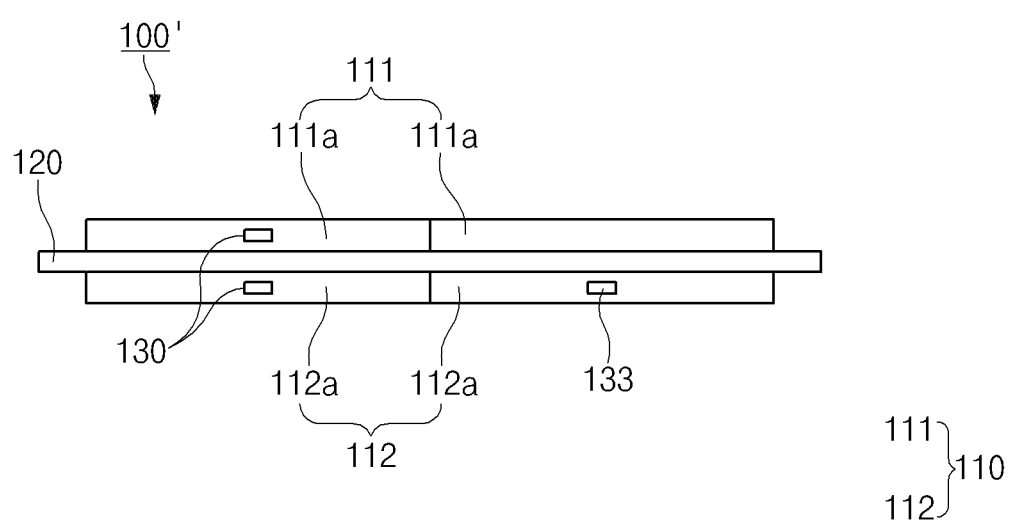
FIG. 8 is a front view of the electrode assembly according to the second embodiment of the present invention.

As illustrated in FIGS. 7 and 8, an electrode assembly 100' according to a second embodiment of the present invention comprises a plurality of unit electrodes 110 formed by connecting a plurality of electrodes made of a solid electrode mixture to each other, a separator 120 interposed between the plurality of unit electrodes 110, and an electrode tab 130 attached to the unit electrode 110.

Here, the plurality of unit electrodes 110 comprise a first unit electrode 111 and a second unit electrode 112. The first unit electrode 111 is provided as a positive unit electrode, and the second unit electrode 112 is provided as a negative unit electrode.

When charging, the second unit electrode that is the negative unit electrode may have a temperature less than that of the first unit electrode that is the positive unit electrode to deteriorate the charging performance.

To solve this problem, in the electrode assembly 100' according to the second embodiment of the present invention, a heating wire 133 may be further attached to the second unit electrode that is the negative unit electrode. When the electrode assembly 100' is charged, the heating wire 133 may allow the second unit electrode 112 that is the negative unit electrode to increase in temperature, thereby improving the rapid charging performance of the second unit electrode.

Thus, the electrode assembly 100' according to the second embodiment of the present invention may have a feature in which the heating wire 133 is further attached to the second unit electrode that is the negative electrode unit electrode. Therefore, the second unit electrode that is the negative unit electrode may increase in temperature to improve the charging performance, thereby improving the charging efficiency of the electrode assembly.

Experimental Example

When measuring a temperature and resistance variation of the second unit electrode, which is a negative unit electrode, while slow and rapid charging the secondary battery comprising the electrode assembly 100' according to the second embodiment of the present invention, which is manufactured as described above, a resistance graph of FIG. 9 may be obtained.

Figure 9:
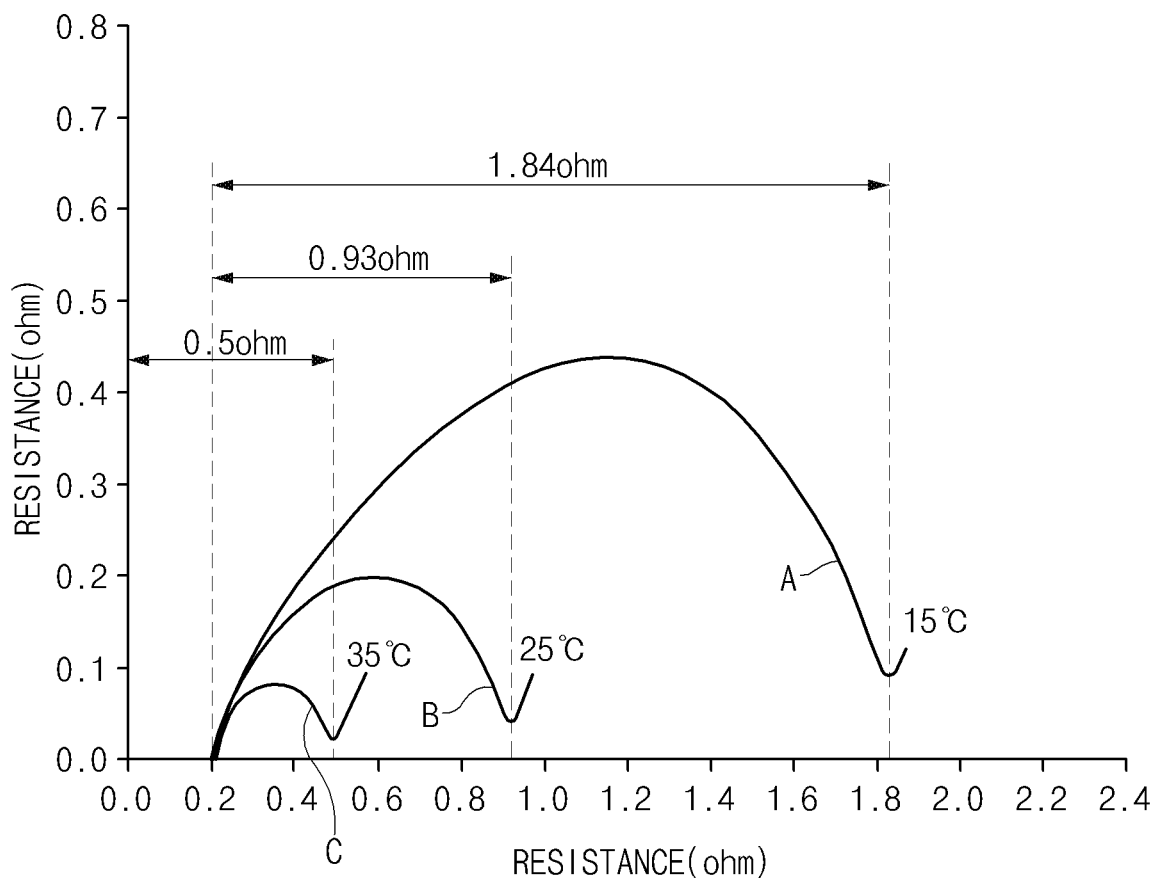
FIG. 9 is a graph illustrating experimental results of the present invention.

First: when measuring the resistance variation of the second unit electrode, which is the negative unit electrode, while charging the electrode assembly 100' by using the first electrode tab 111 having the low specific resistance during the slow charging, a resistance graph such as a curve A of FIG. 9 may be obtained.

That is, referring to the curve A of FIG. 9, it is seen that the temperature of the second unit electrode, which is the negative unit electrode, is 15° C., and resistance of approximately 1.64 ohm occurs.

Second: when measuring the resistance variation of the second unit electrode, which is the negative unit electrode, while charging the electrode assembly 100' by further using the second electrode tab 112 having the high specific resistance during the rapid charging, a resistance graph such as a curve B of FIG. 9 may be obtained.

That is, referring to the curve B of FIG. 9, it is seen that the temperature of the second unit electrode, which is the negative unit electrode, is 25° C., and resistance of approximately 0.73 ohm occurs.

That is to say, comparing the curves A and B of FIG. 9 to each other, it is seen that, as the second electrode tab 112 having the high specific resistance is further used, the temperature of the second unit electrode that is the negative unit electrode increases by 10° C., and the resistance is reduced by approximately 0.91 ohm during the rapid charging when compared to the temperature and resistance of the second unit electrode during the slow charging.

Third: when measuring the resistance variation of the second unit electrode, which is the negative unit electrode, while charging the electrode assembly 100' by further using the second electrode tab 112 having the high specific resistance and simultaneously allowing the second unit electrode, which is the negative unit electrode, to increase in temperature through the heating wire during the rapid charging, a resistance graph such as a curve C of FIG. 9 may be obtained.

That is, referring to the curve C of FIG. 9, it is seen that the temperature of the second unit electrode, which is the negative unit electrode, is 35° C., and resistance of approximately 0.3 ohm occurs.

That is to say, comparing the curves B and C of FIG. to each other, it is seen that the temperature of the second unit electrode that is the negative unit electrode increases by 10° C., and the resistance is reduced by approximately 0.43 ohm during the rapid charging in which the heating wire is used.

Accordingly, as the results of the above experiment, it may be seen that when the temperature of the second unit electrode, which is the negative unit electrode, increases, the resistance decreases. Therefore, as the resistance decreases, the charging performance may be improved, thereby the charging efficiency of the electrode assembly.

Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. An electrode assembly comprising:
a first unit electrode comprising a plurality of first electrodes comprising an electrode mixture having a solid shape and directly connected in a thickness direction of the plurality of first electrode and to form first single flat structure;
a second unit electrode comprising a plurality of second electrodes comprising the electrode mixture having the solid shape and directly connected in a thickness direction of the plurality of second electrodes and to form second single flat structure;
a separator interposed between the first unit electrode and the second unit electrode; and
first and second electrode tabs, which are respectively attached to the first and second unit electrodes, respectively, and which have different resistances
wherein the first and second unit electrodes do not include a collector.

2. The electrode assembly of claim 1, wherein the first electrode tab has a resistance less than a resistance of the second electrode tab.

3. The electrode assembly of claim 1, a heating wire is further attached to the second unit electrode.

4. The electrode assembly of claim 1, wherein the electrode mixture comprises a mixture of at least one or more of a conductive material or a binder with an electrode active material.

5. The electrode assembly of claim 1, wherein
each of the first and second unit electrodes forms an integrated conductivity.

6. The electrode assembly of claim 1, wherein the electrode tab is an electrode wire.

* * * * *